United States Patent

Bons

[11] 3,957,273
[45] May 18, 1976

[54] STYLUS HOLDER

[75] Inventor: Wilhelmus Henderikus Johannes Bons, Eindhoven, Netherlands

[73] Assignee: U.S. Philips Corporation, Briarcliff Manor, N.Y.

[22] Filed: Sept. 23, 1975

[21] Appl. No.: 616,051

[30] Foreign Application Priority Data
Oct. 1, 1974  Netherlands...................... 7412915

[52] U.S. Cl. ................................................. 274/37
[51] Int. Cl.² ......................................... G11B 3/02
[58] Field of Search................................ 274/37, 38

[56] References Cited
UNITED STATES PATENTS

| | | | |
|---|---|---|---|
| 2,320,416 | 6/1943 | Dally.................................. | 274/38 |
| 2,601,988 | 7/1952 | Chorpening......................... | 274/37 |
| 3,646,279 | 2/1972 | Stanton............................... | 274/37 |

FOREIGN PATENTS OR APPLICATIONS 637,018  4/1947  United Kingdom.................. 274/37

Primary Examiner—Richard E. Aegerter
Assistant Examiner—Steven L. Stephan
Attorney, Agent, or Firm—Frank R. Trifari; David R. Treacy

[57]  ABSTRACT

A stylus holder for electromechanical transducers for the reproduction of signals in a groove of a record carrier, which holder at its one flat end is provided with a stylus which is glued on it, said end being bent towards the side of the stylus through an angle of at least 90°.

5 Claims, 7 Drawing Figures

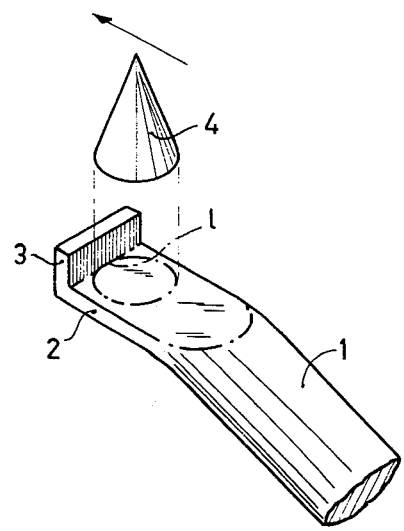
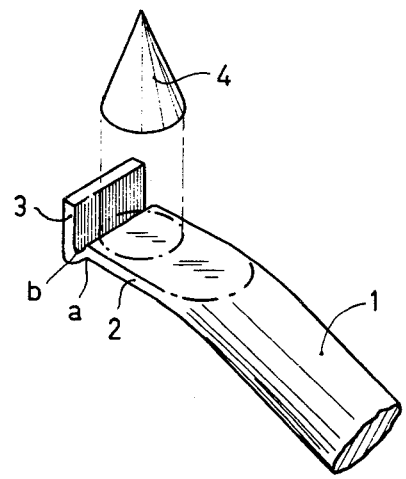
Fig. 1        Fig. 2
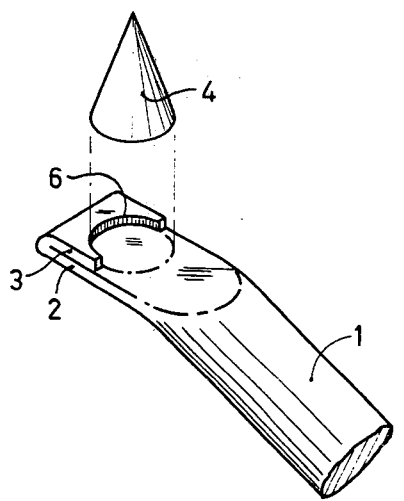
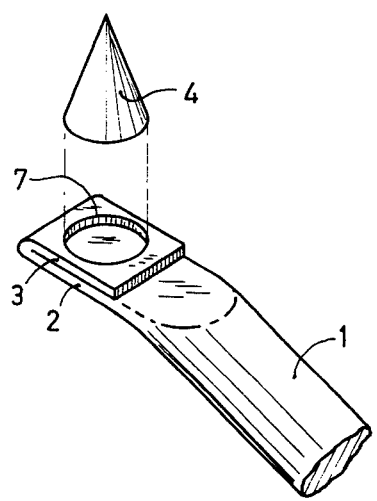
Fig. 3        Fig. 4

STYLUS HOLDER

The invention relates to a stylus holder for electromechanical transducers for the reproduction of audio and/or video information contained in a groove of a record carrier, which holder at its one flat end is provided with a substantially conical stylus with a round or polygonal base, which is glued thereto.

Such stylus holders are known from German Gebrauchsmuster No. 1,773,556, a conical stylus being glued to a flat stylus holder. During playing of a phonograph record said stylus is loaded in the direction of the glued surface in such a way that the cemented surface is subject to shear with the risk of the stylus tip becoming detached from the stylus holder. This mainly plays a part with stylus holders which are commonly used in stereophonic or quadraphonic pick-ups and which have a circular cross-section. A solution is then to mill a slot into the round rod and to glue the stylus tip therein. Said solution is fairly expensive owing to the additional milling operation. A cheaper solution is obtained with a stylus holder, whose end, according to the invention, is bent through an angle of at least 90° towards the side of the stylus. If the stylus is glued in such a way that its flat surface is tangent to the bent end, the load in the direction of movement of the record carrier is taken up by said end and the glued joint is no longer subject to shear. In this respect "bent" is to be understood to mean also upsetting of the relevant part.

According to a further feature of the invention the end at the location of the line of bending is first bent away from the stylus and is subsequently bent back towards the side of the stylus. The advantage of this is that the rounding, which is always produced after one bending operation and which may give rise to the glued joint being subjected to a load component in the direction of the axis of the stylus, is avoided.

In a further embodiment of a stylus holder according to the invention the end is provided with a cut-out which preferably engages with the base of the stylus and which is subsequently bent through an angle of 180°. The advantage of this is that lateral load components acting on the glued joint are also taken up by the bent end. Thus, said cut-out may for example also be V-shaped if the base of the stylus is for example a square, and circular if the base of the stylus is circular.

According to a further feature of an embodiment of the invention, the end is provided with a hole which is adapted to engage with the base of the stylus, and the portion with the hole is bent through an angle of 180°. The stylus is then enclosed by the bent end and the glued joint is no longer subject to shear in the event of incorrect operation such as rotation of the record in the reverse direction.

In a particularly advantageous embodiment of the stylus holder according to the invention, said holder consists of a tube whose end is cut obliquely, after which the oblique tip is flattened and bent in the direction of the longitudinal axis of the stylus holder. Thus, a very light stylus holder is obtained, whose mass is substantially lower than that of a solid stylus holder.

The invention will now be described in more detail with reference to the following Figures in which FIG. 1 represents a stylus holder with an end which is bent or upset through 90°.

FIG. 2 shows a stylus holder whose end is bent twice,

FIG. 3 shows a stylus holder with a concave cut-out,

FIG. 4 shows a stylus holder whose end is provided with a hole, and

Figure 5:
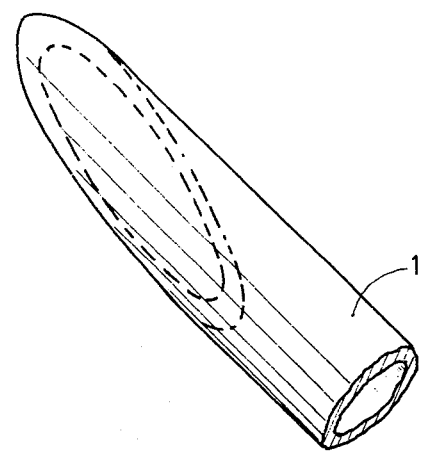
FIGS. 5 through 7 show how a tubular stylus holder can be made.

In FIG. 1 the shank, which in the present case consists of a solid round rod, is flattened at its end 2 and subsequently the end 3 of said flat portion has been bent or upset through an angle of 90°. It is evident that the stylus 4, which is fixed to the stylus holder 1 by a glued joint, is supported in the direction of movement of the record carrier by the end 3, so that said glued joint is no longer subject to shear. If the radius of curvature at the location of the line of bending 1 is not small enough, the risk may occur that the stylus tends to move down along the round portion, and the glued joint is subject to a tensile load or the glued joint becomes too thick, which adversely affects the strength thereof. This drawback has been eliminated in the stylus holder of FIG. 2, where the end 2 is first bent away from the stylus at the location of a and is subsequently bent towards the stylus at the location b, so that at the location of the glued joint the surfaces of the portions 2 and 3 adjoin each other without a radius.

In FIG. 3 the end 3 is provided with a cutout 6 which virtually engages with the base of the stylus 4 at the location of the glued joint, which base in the present instance has a circular shape. It will be evident that the glued joint is now neither subject to shear in a lateral direction.

FIG. 4 shows how in the bent end a hole 7 can be formed with a radius which at least equals the maximum radius of the stylus at the location of the glued joint, so that in the event of incorrect operation, for example if the record is rotated in the reverse direction, the stylus is supported by the end 3. If a stylus with a rectangular base is employed, the hole should preferably be adapted to engage with said base.

Figure 6:
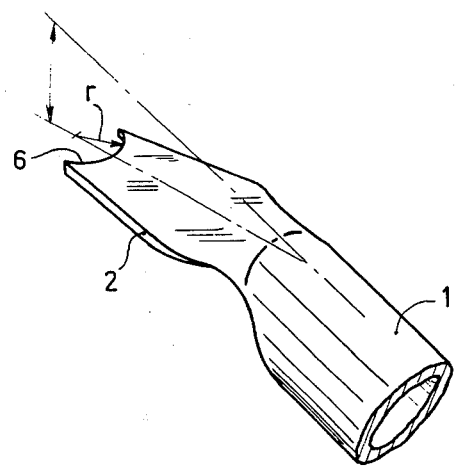
Figure 7:
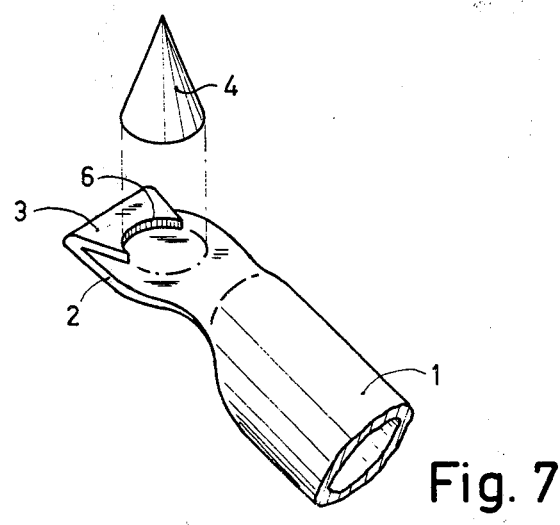

FIG. 5 shows how a tubular stylus holder is cut obliquely, and subsequently, as shown in FIG. 6, is bent and flattened in the direction of the longitudinal axis of the stylus holder, after which it is provided with a concave cut-out with a radius $r$. FIG. 7 shows how the end is subsequently bent through an angle of 180°. It will be evident that the embodiment with a hole can be manufactured in a similar manner.

What is claimed is:

1. A stylus holder for electromechanical transducers for the reproduction of audio and/or video information contained in a groove of a record carrier, which holder at one flat end is provided with an at least partly substantially conical stylus with a round or polygonal base which is glued to the holder, chacterized in that a portion of said end is bent towards the side of the stylus through an angle of at least approximately 90° and the stylus is glued to the holder so as to engage the bent portion.

2. A stylus holder as claimed in claim 1, characterized in that the bent portion is first bent away from the stylus and is subsequently bent back towards the side of the stylus.

3. A stylus holder as claimed in claim 1, characterized in that the bent portion is provided with a cut-out which preferably engages with the base of the stylus and the bent portion bent through an angle of 180°.

4. A stylus holder as claimed in claim 1, characterized in that the bent portion is provided with a hole which is adapted to engage with the base of the stylus, and the portion with the hole is bent through an angle of 180°.

5. A stylus holder as claimed in claim 1, wherein the holder comprised a tube having an end of the tube cut obliquely to form a tip, the oblique tip being flattened and bent towards the longitudinal axis of the tube.

* * * * *